United States Patent
Sasaki et al.

(10) Patent No.: US 8,416,422 B2
(45) Date of Patent: Apr. 9, 2013

(54) LIGHTWAVE INTERFERENCE MEASUREMENT APPARATUS USED TO MEASURE OPTICAL PATH LENGTH OR DISTANCE

(75) Inventors: Takamasa Sasaki, Utsunomiya (JP); Yoshiyuki Kuramoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 224 days.

(21) Appl. No.: 13/038,683

(22) Filed: Mar. 2, 2011

(65) Prior Publication Data

US 2011/0216326 A1 Sep. 8, 2011

(30) Foreign Application Priority Data

Mar. 3, 2010 (JP) .................................. 2010-046321
Aug. 19, 2010 (JP) .................................. 2010-183615

(51) Int. Cl.
*G01B 11/02* (2006.01)
(52) U.S. Cl.
USPC .......................................................... 356/498
(58) Field of Classification Search ............... 356/498, 356/500, 517, 614–624
See application file for complete search history.

(56) References Cited

U.S. PATENT DOCUMENTS

| 5,764,362 | A * | 6/1998 | Hill et al. ........................ 356/487 |
| 6,219,144 | B1 * | 4/2001 | Hill et al. ........................ 356/487 |
| 6,573,996 | B1 * | 6/2003 | Deliwala et al. ................ 356/487 |
| 6,839,141 | B2 * | 1/2005 | Hill ................................ 356/486 |
| 6,867,932 | B2 | 3/2005 | Noguchi |
| 2002/0001086 | A1 * | 1/2002 | De Groot ........................ 356/486 |
| 2006/0256346 | A1 * | 11/2006 | Hill ................................ 356/498 |
| 2007/0024859 | A1 * | 2/2007 | Bodermann ..................... 356/498 |

FOREIGN PATENT DOCUMENTS

| JP | 10-019508 A | 1/1998 |
| JP | 10-096601 A | 4/1998 |
| JP | 2003-005248 A | 1/2003 |

OTHER PUBLICATIONS

G. Bonsch et al."Measurement of the refractive index of air and comparison with modified Edlens formulae" Physikalisch-Technische Bundesabstalt D-38116, Metrologia, 1998, 133-139, 35, Braunschweig, Germany.

* cited by examiner

*Primary Examiner* — Gregory J Toatley
*Assistant Examiner* — Dominic J Bologna
(74) *Attorney, Agent, or Firm* — Rossi, Kimms & McDowell LLP

(57) ABSTRACT

A lightwave interference measurement apparatus includes a phase detector configured to detect a phase of a signal of an interference between light from a distance-measurement light source and reflected on a reference surface and light from the distance-measurement light source and reflected on a target surface, an intensity detector configured to detect an intensity of light from a non-distance-measurement light source having a wavelength different from that of the distance-measurement light source and reflected on the reference surface and an intensity of light from the non-distance-measurement light source and reflected on the target surface, and an analyzer configured to calculate a geometric distance based on an optical path length calculated from the phase and a wavelength of the distance-measurement light source, and an average value of a vapor pressure distribution between the target surface and the reference surface calculated from intensity information of the light from the non-distance-measurement light source.

8 Claims, 3 Drawing Sheets

LIGHTWAVE INTERFERENCE MEASUREMENT APPARATUS USED TO MEASURE OPTICAL PATH LENGTH OR DISTANCE

BACKGROUND OF THE INVENTION

1. Field of the Invention

The present invention relates to a lightwave interference measurement apparatus used to measure an optical path length or distance.

2. Description of the Related Art

The conventional lightwave interference type measurement apparatus calculates a geometric distance between a reference optical path and a target optical path by dividing an optical length found by a wavelength of a light source and a phase found by a signal of an interference between reference light and target light, by a refractive index of air between a reference surface and a target surface. The refractive index of air can be obtained, for example, from an experimental formula described in Bonsch, Potulski, Metrologia, 35, 133-9, 1998, by measuring the temperature, the air pressure, the vapor pressure, and the carbon dioxide concentration, etc. using environmental detectors. When there are spatial and temporal distributions of these environmental factors due to insufficient air conditioning, a measurement value of the environmental detector does not always accord with an average value of a distributing environmental factor. As a result, the precision of the air's refractive index found by the above experimental formula lowers, and the calculation precision of the geometric distance consequently deteriorates. As one measure for correcting fluctuations of the refractive index caused by the distributing environmental factors, for example, Japanese Laid-Open Patent Application ("JP")10-019508 calculates the geometric distance by automatically correcting the fluctuations of the air's refractive index on the target optical path and the reference optical path based on optical path lengths obtained with different wavelengths by utilizing two light sources having different wavelengths. JP 10-096601 automatically corrects the fluctuations of the air's refractive index on the target optical path and the reference optical path by utilizing optical path lengths obtained with three or more wavelengths, and calculates the geometric distance.

However, the method disclosed by JP 10-019508 augments a distance measurement error without the vapor pressure of 0 [Pa] or in dry air, and thus is useless to the general environments that have a vapor pressure distribution on the measurement optical path. On the other hand, the method disclosed by JP 10-096601 is applicable the wet environment but the measurement precision of the calculated geometric distance deteriorates by one digit order or higher when the wavelength of the light source and the detection precision of the phase are similar to those of JP 10-019508. In order to maintain the similar precision of the geometric distance, the light source needs a wavelength region of a $CO_2$ laser, for example, and becomes impractically bigger.

SUMMARY OF THE INVENTION

The present invention provides a lightwave interference measurement apparatus configured to correct air's refractive index fluctuations and applicable to general wet environments.

A measurement apparatus according to one aspect of the present invention is configured to measure a geometric distance between a reference optical path and a target optical path utilizing lightwave interference. The measurement apparatus includes a phase detector configured to detect a phase of a signal of an interference between light emitted from a distance-measurement light source and reflected on a reference surface and light emitted from the distance-measurement light source and reflected on a target surface, an intensity detector configured to detect an intensity of the light emitted from a non-distance-measurement light source having a wavelength different from that of the distance-measurement light source and reflected on the reference surface and an intensity of light emitted from the non-distance-measurement light source and reflected on the target surface, and an analyzer configured to calculate the geometric distance based on an optical path length calculated from the phase and a wavelength of the distance-measurement light source, and an average value of a vapor pressure distribution between the target surface and the reference surface calculated from intensity information of the light emitted from the non-distance-measurement light source.

Further features of the present invention will become apparent from the following description of exemplary embodiments with reference to the attached drawings.

DESCRIPTION OF THE EMBODIMENTS

Next follows a detailed description of embodiments of the present invention with reference to the accompanying drawings.

First Embodiment

Figure 1:
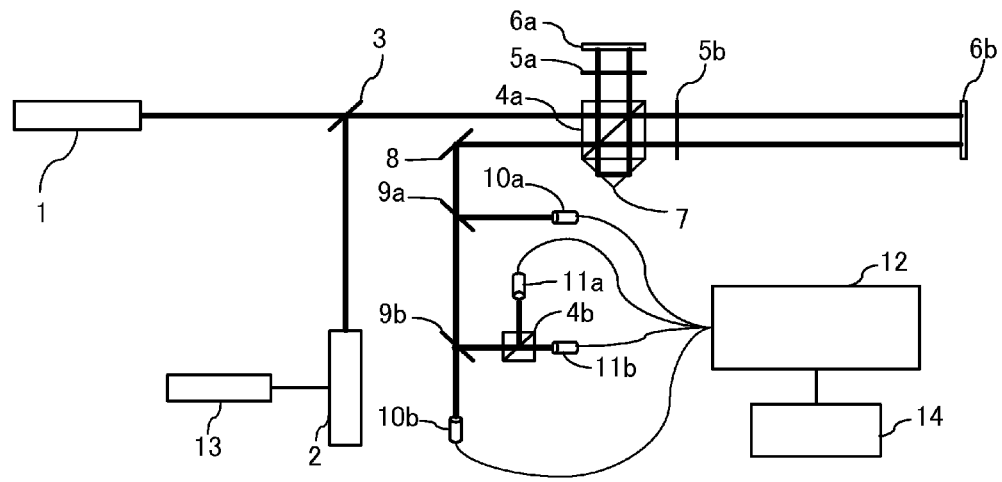
FIG. 1 is a structural diagram of a lightwave interference measurement apparatus according to first and second embodiments.

A description will now be given of a lightwave interference measurement apparatus of this embodiment. FIG. 1 is a structural diagram of a lightwave interference measurement apparatus of this embodiment.

The lightwave interference measurement apparatus of this embodiment has two different light source units 1, 2. The light source unit 1 is a distance-measurement light source configured to emit laser beams having two different wavelengths. The air's refractive-index fluctuation can be highly precisely corrected by measuring the optical path length utilizing two laser beams having different wavelengths, as described above. These two different wavelengths may be a fundamental wave and a double wave. Since the intensity and the wavelength stability of the double wave rely upon the fundamental wave, an error of an optical path length caused by the wavelength stability is cancelled out between the optical lengths measured with the fundamental wave and double wave. In addition, using only one laser light source can reduce the cost. Instead of generating the double wave, there may be a plurality of separate laser light sources having different wavelengths. Alternatively, a multi-wavelength light source having a plurality of narrow-band spectra may be used. Multi-wavelength light having a wide-band spectrum may be introduced to a filter, such as etalon, and may be used as light having a plurality of narrow-band spectra. The light source unit 2 is a light source used to measure the vapor pressure (or a non-distance-measurement light source). Each light flux emitted from the light source units 1, is adjusted so that a direction of the polarized light inclines by 45° relative to the paper plane. In addition, in order to lessen the distance measurement errors caused by the wavelength stability, its wavelength is stabilized to the wavelength of the absorption line of etalon or gas.

The light flux emitted from the light source unit 1 transmits through the prism 3 as a spectral element, enters a polarization beam splitter ("PBS") 4a, and is split into two beams having polarization states orthogonal to each other. The light reflected on the PBS 4a passes a quarter waveplate 5a, is reflected on a reference mirror 6a fixed at a reference position, again passes the quarter waveplate 5a, and enters the PBS 4a. When the light passes the quarter waveplate 5a twice, the polarization state is rotated by 90°, the light passes the PBS 4a, and is reflected on a corner cube 7. Thereafter, similarly, the light passes through the PBS 4a, the quarter waveplate 5a, the reference mirror 6a, and the quarter waveplate 5a, and is reflected on the PBS 4a. The light reflected on the reference surface 6a will be referred to as "reference light" hereinafter. On the other hand, the light that has transmitted through the PBS 4a twice reaches a target mirror 6b fixed on a target via a quarter waveplate 5b, and retransmits the PBS 4a. The light reflected on the target surface 6b will be referred to as "target light" hereinafter. The target light and the reference light are reflected on the mirror 8, and the fundamental wave and the double wave are separated by the spectral element 9a. The fundamental wave enters the phase detector 10a, and the double wave enters the phase detector 10b.

Figure 2:
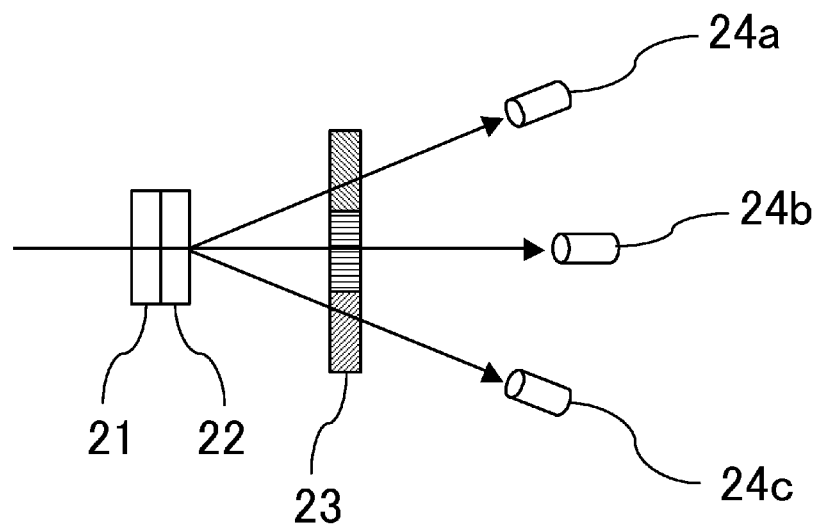
FIG. 2 is a structural diagram of a phase detector according to the first and second embodiments.

FIG. 2 illustrates one illustrative structure of each of the phase detectors 10a, 10b. Each of the phase detectors 10a, 10b includes a quarter waveplate 21 as a means for applying a known phase difference to the target light and the reference light, a grating beam splitter 22, a polarizer array 23, and three light-quantity detectors 24a, 24b, 24c configured to detect interference signals having three known phase differences. The target light flux and reference light flux incident from the left side in FIG. 2 have linearly polarized beams that are orthogonal to each other, and are converted into a rightward circularly polarized beam and a leftward circularly polarized beam when these beams pass through the quarter waveplate 21 having an axis that forms an angle of 45° relative to the polarization direction. Thereafter, the light is equally split into three light fluxes, such as a $0^{th}$ order beam and $\pm 1^{st}$ order diffracted beams. The divided light flux transmits through the polarizer array 23 configured to act as a polarizer having a different transmission axis for each light flux, and then provides a signal having a known phase difference corresponding to a transmission axis angle of the polarizer. The light-quantity detectors 24a, 24b, 24c detect the light quantities and send the detection signals to the analyzer 12. The analyzer 12 calculates a phase difference between the target light and the reference light based on the above signals.

Next follows a description of a vapor pressure measuring optical system configured to correct fluctuations of the refractive index of air. This embodiment utilizes the absorptions of the water vapor on the reference optical path and on the target optical path, measures an average value of the vapor pressure distribution on the measurement axis, and corrects the fluctuation of the air's refractive index utilizing the measurement result.

The laser light source unit 2 outputs light having a single wavelength in this embodiment. The wavelength of the laser light source unit 2 needs to accord with that of the absorption line of the water vapor. Accordingly, the wavelength is scanned near the absorption line of the water vapor using a laser control unit in the laser light source unit 2, and set so that the intensity of the laser beam output from the analyzer 12 can be minimum. When a difference in wavelength between the fundamental wave and the double wave of the laser light source unit 1 falls within 20 nm, the performance required for coating of the optical element can be mitigated for the wavelength of the laser light source unit 2. Using a narrow-band light source for the laser light source unit 2 can provide sufficient absorptions and highly sensitive measurements. When the S/N ratio is high, the wide-band light source can be used.

In addition, the light emitted from the laser light source unit 2 is adjusted by the prism 3 so that its optical axis can accord with the distance-measurement optical path, and introduced to the PBS 4a. After the light reflected on the PBS 4a is reflected twice on the reference mirror 6a fixed at the reference position, and then reflected on the PBS 4a. On the other hand, the light that has transmitted through the PBS 4a is reflected twice on the target mirror 6b fixed on the target, and then retransmits the PBS 4a. The target light and the reference light are reflected on the mirror 8, transmit the prism 9a, are reflected on the prism 9b, and enter the PBS 4b. The target light and the reference light are separated by the PBS 4b, and sent to the analyzer 12 after their intensities are detected by the photodetectors (intensity detectors) 11a, 11b. The analyzer 12 calculates an average value of the vapor pressure on the measurement axis from the transmission light intensities of the target light and the reference light. When the light reflected on the reference surface is set to the reference light as described above, the target light and the reference light pass the same types of optical elements and the same number of optical elements from the laser light source unit 2 to the polarization beam splitter 4b. Therefore, the influence of the transmission light intensity error reduces which is caused by the passage of the light through different optical elements and the measurement error of the absorption amount can be restrained. A memory 14 stores a first relationship among the following geometric distance L [m], calculation precision $\delta p_w$ [Pa] of the vapor pressure expressed by Expression 5 below, and an absorption parameter $\sigma_w$ [Pa$^{-1}$m$^{-1}$] of water vapor expressed by Expression 4 below. The first relationship is a relationship illustrated in FIG. 4. The memory 14 also stores a second relationship between the absorption parameter $\sigma_w$ [Pa$^{-1}$m$^{-1}$] expressed by Expression 4 below and a wavelength [λ] of the absorption line of water vapor. The memory 14 further stores one or more of the following expressions or an expression derived from these expressions.

Figure 3:
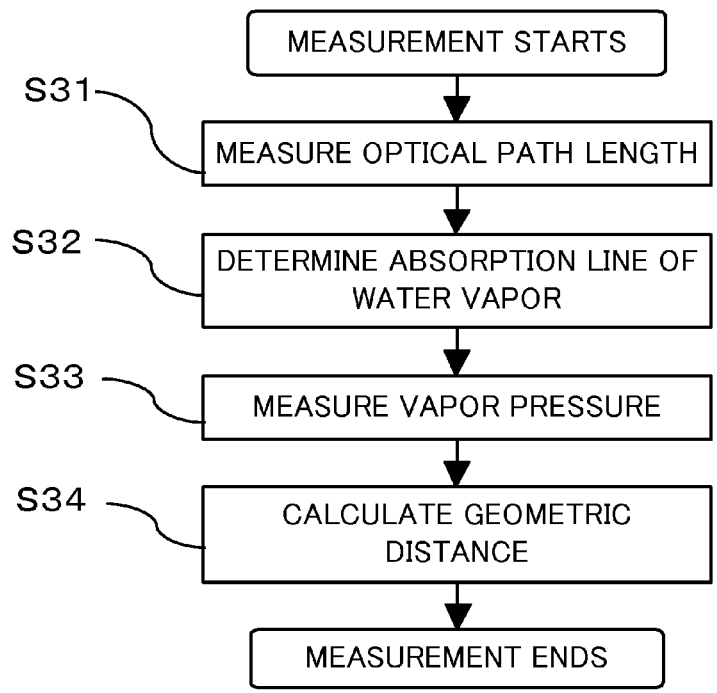
FIG. 3 is a measurement flowchart according to the first and second embodiments.

Next follows an analysis operation executed by the analyzer 12 with reference to the flowchart of FIG. 3. This embodiment calculates the geometric distance L as a difference between the reference optical path and the target optical path by erasing a term that depends upon the temperature, the air pressure, the carbon dioxide concentration of the air's refractive index from the optical paths of the fundamental wave and the double wave. The dependency upon the vapor pressure is left but a value of the vapor pressure measured by utilizing the absorption of the water vapor is an average value of the vapor pressure distribution on the measurement axis, and thus the spatial distribution of the air's refractive index is corrected by utilizing the measurement result and the distance can be found. A detailed description will be given below.

Initially, an optical path length $OPL_1$ of the fundamental wave and an optical path length $OPL_2$ of the double wave are calculated in S31. An interference signal Ia detected by a light-quantity detector 24a, an interference signal Ib detected by a light-quantity detector 24b, and an interference signal Ic detected by a light-quantity detector 24c are signals associated with known phase differences corresponding to the transmission axis angle of the polarizer in the polarizer array 23, and expressed by Expression 1 when three signals having phase differences of 120° intervals have the same transmittances:

$$\begin{cases} I_a = I_0\{1 + V\cos\phi\} \\ I_b = I_0\{1 + V\cos(\phi + 2\pi/3)\} \\ I_c = I_0\{1 + V\cos(\phi + 4\pi/3)\} \end{cases} \qquad \text{Expression 1}$$

Here, V is the contrast of the interference signal, and $\phi$ is a phase difference of the interference signal caused by an optical path length difference between the target light flux and the reference light flux. The phase difference $\phi$ in Expression 1 can be calculated by Expression 2:

$$\phi = \frac{1}{2\pi}\tan^{-1}\left(\frac{\sqrt{3}(I_c - I_b)}{2I_a - I_b - I_c}\right) \qquad \text{Expression 2}$$

The analyzer 12 digitalizes the light quantity signal from the light-quantity detectors 24a, 24b, 24c in the phase detectors 10a, 10b through an A/D converter, and calculates a phase using Expression 2. The difference in length between the reference optical path and the target optical path can be calculated by Expression 3.

$$OPL = n \cdot L = \frac{\lambda}{4} \cdot \phi \qquad \text{Expression 3}$$

Here, n is the refractive index of air, L is a geometric distance between the reference mirror and the target mirror, $\phi$ is a phase to be calculated, and $\lambda$ is a wavelength of the fundamental wave or a double wave in vacuum.

Next, the wavelength of the absorption line of water vapor is determined in S32. As described later, the calculation precision of the geometric distance L depends upon the measurement precision of the vapor pressure $p_w$ [Pa], and it is thus necessary to precisely measure the vapor pressure $p_w$ [Pa] so as to precisely calculate the geometric distance L. The measurement precision $\delta p_w$ [Pa] of the vapor pressure depends upon the geometric distance L[m] and absorption parameter $\sigma_w$ [Pa$^{-1}$m$^{-1}$] of the vapor pressure. Here, the absorption parameter $\sigma_w$ is defined by Expression 4.

$$\sigma_w = S \cdot \phi(\lambda) \qquad \text{Expression 4}$$

$\delta p_w$ is given by Expression 5 in this embodiment.

$$\delta p_w(\sigma_w, L, p_w) \cong \frac{\partial p_w}{\partial T}\delta T \cong \frac{\delta T}{L \cdot \sigma_w \cdot e^{-p_w \cdot \sigma_w \cdot L}} \qquad \text{Expression 5}$$

Figure 4:
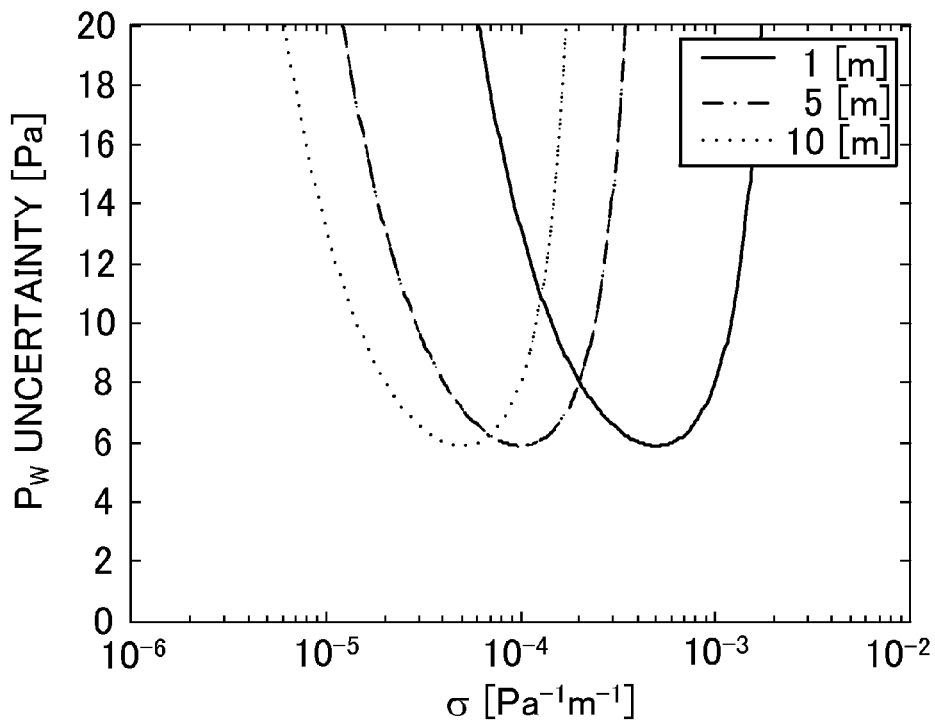
FIG. 4 is a schematic diagram that illustrates a relationship between an absorption parameter of the vapor pressure and the distance measurement precision.

Here, S is the intensity of the absorption line, and $\phi$ is a normalized absorption line shape function, and the absorption parameter is a product $\sigma_w$ between the absorption-line intensity S and the peak value of the absorption line function $\phi$. These values can be obtained from absorption line database of the gas, such as Hitran. The calculation precision of the vapor pressure becomes worse as the vapor pressure of the measurement environment becomes higher. FIG. 4 compares the geometric distances L to be measured of 1[m], 5[m], and 10 [m] with each other where the abscissa axis denotes the absorption parameter $\sigma_w$ of the water vapor and the ordinate axis denote the calculation precision $\delta p_w$ of the vapor pressure. When L is fixed and the dependency of $\delta p_w$ upon $\sigma_w$ is considered, $\sigma_w$ has a value of $\sigma_{best}$ that minimizes $\delta p_w$ from FIG. 4. Hence, the vapor pressure can be highly precisely calculated by stabilizing the wavelength of the light source unit 2 to the wavelength of the absorption line of the water vapor that provides the absorption parameter $\sigma_w = \sigma_{best}$. $\sigma_{best}$ is given by Expression 6:

$$\sigma_{best} \cong \frac{1}{p_w L} \qquad \text{Expression 6}$$

It is understood from FIG. 4 that when the value of the geometric distance L varies the value of $\sigma_{best}$ changes and as L becomes smaller the value of $\sigma_{best}$ becomes larger. That is, the value of the absorption parameter $\sigma_{best}$ that can enable the vapor pressure $p_w$ to be highly precisely calculated changes as the value of the geometric distance L to be measured varies. Accordingly, in order to highly precisely calculate the vapor pressure $p_w$, the wavelength of the light source unit 2 needs to be stabilized to the absorption parameter $\sigma_{best}$ according to the geometric distance L to be measured. In this step, the value of the geometric distance L is unknown but the value of the optical path length measured in S31 (optical path length measurement result) can be used instead. Indeed, it is not always necessary to stabilize the wavelength of the light source unit 2 to the wavelength of the absorption line as the absorption parameter $\sigma_{best}$, and it may be stabilized to the wavelength of the absorption line of the water vapor of the absorption parameter $\sigma_{best}$ which satisfies $\delta p_w < \Delta p_w$ when the necessary vapor pressure precision is $\Delta p_w$. In other words, the wavelength of the light source unit 2 may be stabilized to the vapor's absorption line wavelength in the absorption parameter value range which is equal to or smaller than the predetermined vapor pressure precision $\Delta p_w$. The vapor pressure precision $\Delta p_w$ of about 10 [Pa] is necessary to measure the upper limit value of the vapor pressure of 2000 [Pa] in the general environment with a measurement distance from 1 [m] to 10 [m] and the relative precision of $10^{-8}$. Therefore, the absorption parameter that satisfies $\delta p_w < \Delta p_w$ falls within a value range $10^{-5}$ [Pa$^{-1}$m$^{-1}$]$<\sigma_w<2\times10^{-3}$ [Pa$^{-1}$m$^{-1}$]. The analyzer 12 can obtain a wavelength that provides a peak of the water vapor's absorption line from the second relationship stored in the memory 14 and the range $10^{-5}$ [Pa$^{-1}$m$^{-1}$] $<\sigma_w<2\times10^{-3}$ [Pa$^{-1}$m$^{-1}$] which satisfies $\delta p_w<\Delta p_w$. In stabilizing the wavelength of the light source unit to the absorption parameter $\sigma_{best}$, the analyzer 12 obtains, from the first relationship stored in the memory 14, the absorption parameter $\sigma_w = \sigma_{best}$ that minimizes the value of the $\delta p_w$ corresponding to the optical path length measured in S31. Then, the analyzer 12 obtains the wavelength of the water vapor's absorption line closest to the absorption parameter $\sigma_{best}$ from the second relationship stored in the memory 14.

In addition, when the measurement object moves too far to guarantee the distance measurement precision with the same absorption line, the water vapor's absorption line used to stabilize the wavelength of the light source unit 2 may be switched on demand to the absorption line that satisfies $\delta p_w < \Delta p_w$ according to the optical path length to be measured. Thereby, the distance measurement precision can be always maintained. A plurality of laser light sources (a plurality of narrow-band light sources having different wavelengths) which have wavelengths stabilized to different absorption-line wavelengths that satisfies $\delta p_w < \Delta p_w$ may be previously prepared for different distance to be measured. Alternatively, a wavelength scanning type light source may be used for the light source unit 2, and the transmission spectral may be always obtained using a plurality of different absorption lines by scanning the wavelength of the light source unit 2.

Next, the average value of the vapor pressure on the measurement axis is calculated in S33. In general, Expression 7 is established for a ratio $T(\lambda)$ of the intensity of the target light to the intensity of the reference light based on the Lambert-Beer law:

$$T(\lambda) = \frac{I_{test}}{I_{ref}} = \sum_i \exp[-p_i \cdot \sigma_i(\lambda) \cdot L] \qquad \text{Expression 7}$$

Here, $I_{test}$ is the intensity of the target light (intensity information), $I_{ref}$ is the intensity of the reference light (intensity information), $\lambda$ is the wavelength of the laser beam from the light source unit 2, i is a gas type in air, $p_i$ is a partial pressure of the gas i, $\sigma_i$ is an absorption parameter, and L is the geometric distance between the target mirror and the reference mirror. Only water vapor w may be considered as i in the right side $\Sigma$ of Expression 7 by selecting a wavelength that provides a sufficiently small absorption of other gasses except for water vapor in air. Accordingly, when $T(\lambda)$, the absorption parameter $\sigma_w(\lambda)$, and the geometric distance L are known, the average vapor pressure $p_w$ on the measurement axis can be calculated from Expression 7. The water vapor's absorption parameter $\sigma_w$ can be calculated from a known theoretical expression based on gas absorption line database, such as Hitran, or actually measured. Although the geometric distance L is unknown, the value of the optical path length OPL may be used instead. An error in the vapor pressure $p_w$ caused as a result of that the value of the optical path length OPL is used as the geometric distance L is insignificant and the following Expression 9 used to correct the refractive-index fluctuation is little affected. As a consequence, the average vapor pressure $p_w$ on the measurement axis can be calculated from Expression 8:

$$p_w = -\frac{\ln T(\lambda)}{\sigma_w(\lambda) \cdot L} \qquad \text{Expression 8}$$

This embodiment locks the wavelength of the light source unit 2 to one water vapor's absorption peak, the absorption spectrum may be found by utilizing a wavelength variable light source, such as a DFB laser, for the light source unit 2, and by scanning the wavelength across the one vapor's absorption spectrum. The axial vapor pressure $p_w$ can be found through fitting by utilizing the vapor pressure $p_w$ as a fitting parameter in Expression 7.

Finally, the geometric distance L is calculated in S34. The geometric distance L is calculated from Expression 9 using the optical path length $OPL_1$ measured with the fundamental wave, the optical path length $OPL_2$ measured with double wave, and the vapor pressure $p_w$.

$$L = \frac{K(\lambda_1) \cdot OPL_2 - K(\lambda_2) \cdot OPL_1}{K(\lambda_1) - K(\lambda_2) + p_w \cdot (g(\lambda_1) K(\lambda_2) - g(\lambda_2) K(\lambda_1))} \qquad \text{Expression 9}$$

Here, $K(\lambda)$ and $g(\lambda)$ are terms of the dispersion of air and the dispersion of water vapor, respectively, and their experimental formulas are described in Bonsch, Potulski, Metrologia, 35, 133-9, 1998.

This embodiment is applicable even when a gas other than water vapor exists. In general, a refractive index $N(\lambda)$ of a material can be expressed by the Sellmeier's dispersion formula of Expression 10 except for the vicinity of the material's resonance frequency:

$$N(\lambda) \cong A + \frac{B}{1 - C/\lambda^2} \qquad \text{Expression 10}$$

Here, A, B, and C are material constants. The air's refractive index can be expanded to Expression 11 when Expression 10 is assumed for a dispersion $g_i(\lambda)$ of a gas other than water vapor.

$$n(\lambda) = 1 + D(t, P, x) \cdot K(\lambda) - p_w \cdot g(\lambda) - \sum_i p_i \cdot N_i(\lambda) \qquad \text{Expression 11}$$

Here, i represents a gas type, $p_i$ is a partial pressure of the gas i, and $N_i(\lambda)$ is a dispersion of the gas i. Expression 11 combined with the optical path length measurement result using the plurality of wavelengths, the geometric distance L can be expressed as a function of the optical path lengths using the plurality of wavelengths and the partial pressure $p_i$ of the gas i to be addressed. Even when another gas exist in air, the geometric distance can be highly precisely calculated by considering the influence.

As described above, this embodiment calculates the average vapor pressure on the measurement axis by utilizing the absorption of the water vapor on the measurement optical path. Thereby, this embodiment can provide a lightwave interferometer configured to correct the refractive index fluctuations and to highly precisely calculate a geometric distance between the target surface and the reference surface even in the general wet environment in which the vapor pressure distributes on the measurement optical path.

Second Embodiment

This embodiment is different from the first embodiment in the vapor pressure measurement method in S32 and S33. This embodiment modulates the frequency of the (non-distance-measurement) light emitted from the laser light source unit 2 using the frequency modulation unit (wavelength modulator) 13 in FIG. 1. An average value of the vapor pressure distribution can be precisely measured by synchronously detecting the modulation frequency component in the signals detected by the photodetectors 11a, 11b.

Figure 5:
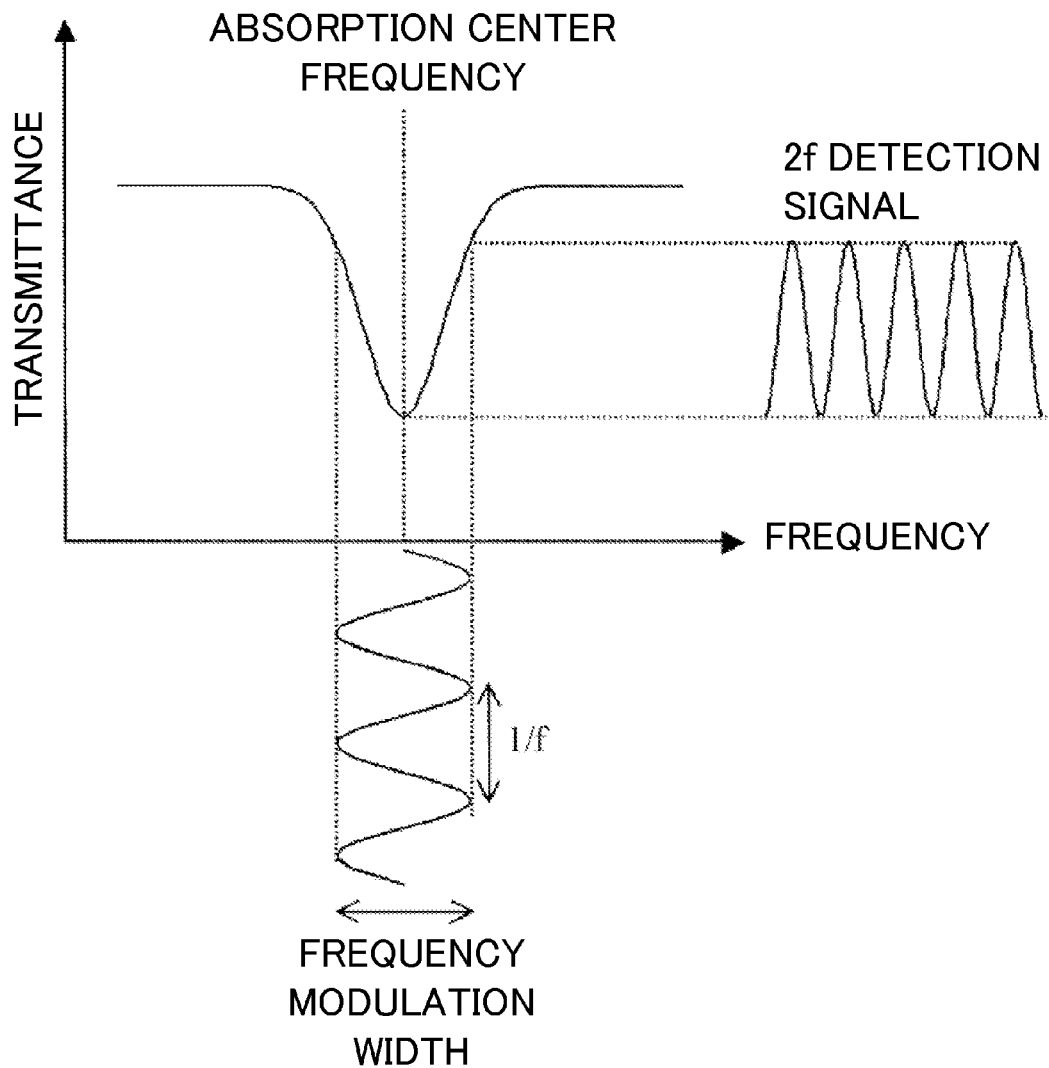
FIG. 5 is a schematic diagram of a wavelength modulating method according to the second embodiment.

The laser light source unit 2 may use a semiconductor laser, such as a DFB laser. The DFB laser can change the laser's oscillation wavelength by utilizing the injected current, and the laser's oscillation wavelength is modulated by modulating the injected current. The frequency modulation unit 13 modulates the stabilized wavelength of the laser light source unit 2 with the frequency f around the oscillation wavelength. As illustrated in FIG. 5, the modulation with frequency f around the water vapor's absorption line provides an asymmetric absorption spectrum with respect to the absorption center wavelength and a 2f modulated component in the detected signal intensity.

Since the low-frequency noises can be reduced by synchronously detecting only the 2f modulation component from the signals detected by the photodetectors 11a, 11b, the analyzer 12 can highly precisely measure the vapor pressure. The spectrum intensity $S_2(v)$ of the detected $2f$ signal is expressed by Expression 12. Here, $v(t)$ is an oscillation frequency of the laser light source unit 2, $I_0(t)$ is an intensity to be detected, $v_0$ is a central frequency of the absorption line, $\Delta v$ and $\Delta i_0$ are frequency modulation amplitude and intensity modulation amplitude of the laser light source unit 2, $\phi$ is a phase shift, $\tau$ is a time waveform of the intensity transmittance, and $H_n$ is a Fourier coefficient in the Fourier series expansion.

$$v(t) = v_0 + \Delta v \cos(2\pi f t)$$

$$I_0(t) = I_0 + \Delta i_0 \cos(2\pi f t + \psi)$$

$$\tau(v(t)) = 1 - \exp[-P_w \cdot S_w(T) \cdot \phi(v(t)) \cdot L]$$

$$= \sum_{n=0}^{\infty} H_n(v_0, \Delta v) \cos(n 2\pi f t + \psi)$$

$$H_n(v_0, \Delta v) = \frac{1}{\pi} \int_{-\pi}^{\pi} \tau(v_0 + \Delta v \cos(\theta)) \cos(n\theta) d\theta$$

$$S_2(v) = -\frac{\Delta i_0}{2} H_3(v_0, \Delta v) + I_0 H_2(v_0, \Delta v) - \frac{\Delta i_0}{2} H_1(v_0, \Delta v)$$

Expression 12

The analyzer 12 can find the intensity spectrum $S_2(v)$ by Fourier-transforming the synchronously detected $2f$ signal, and then the vapor pressure through fitting of Equation 12 using $p_w$ as a fitting parameter. In this embodiment, the calculation precision $\delta p_w$ of the vapor pressure is expressed by Equation 13:

$$\delta p_w(\sigma_w, L, p_w) \cong \frac{\partial p_w}{\partial T} \delta T \cong \frac{\delta T}{L \int_{-\pi}^{\pi} \sigma_w e^{-p_w \cdot \sigma_w \cdot L} \cdot \cos 2\theta \cdot d\theta}$$

Expression 13

The absorption parameter $\sigma_{best}$ that enables the vapor pressure to be highly precisely calculated is expressed by Expression 6. This embodiment improves the S/N ratio of the detected signal through lock-in detections, and makes the measurement precision $\delta T$ of the transmittance better than the first embodiment by about two-digit order.

The vapor pressure precision $\Delta p_w$ of about 10 [Pa] is necessary to measure the upper limit value of the vapor pressure of 2000 [Pa] in the general environment with a measurement distance from 1 [m] to [m] and the relative precision of $10^{-8}$. Therefore, when the absorption parameter that satisfies $\delta p_w < \Delta p_w$ is found by numerical calculations using Expressions 12 and 13, the absorption parameter approximately satisfies $10^{-7}$ [Pa$^{-1}$m$^{-1}$]$<\sigma_w<4\times 10^{-8}$ [Pa$^{-1}$m$^{-1}$].

Other than S32 and S33, this embodiment is similar to the first embodiment and a description of this embodiment will be omitted. The measurement apparatus of this embodiment can highly precisely calculate the vapor pressure on the measurement optical path by modulating the wavelength of the laser light source unit 2, and highly precisely calculate a geometric distance between the reference mirror 6a and the target mirror 6b even when the vapor pressure distributes on the measurement optical path.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The lightwave interference type measurement apparatus is applicable to a measurement of an optical path or distance.

This application claims the benefit of Japanese Patent Application Nos. 2010-046321, filed Mar. 3, 2010, and 2010-183615, filed Aug. 19, 2010, each of which is hereby incorporated by reference herein in its entirety.

What is claimed is:

1. A measurement apparatus configured to measure a geometric distance between a reference optical path and a target optical path utilizing lightwave interference, the measurement apparatus comprising:
   a phase detector configured to detect a phase of a signal of an interference between light emitted from a distance-measurement light source and reflected on a reference surface and light emitted from the distance-measurement light source and reflected on a target surface;
   an intensity detector configured to detect an intensity of light emitted from a non-distance-measurement light source having a wavelength different from that of the distance-measurement light source and reflected on the reference surface and an intensity of light emitted from the non-distance-measurement light source and reflected on the target surface; and
   an analyzer configured to calculate the geometric distance based on an optical path length calculated from the phase and a wavelength of the distance-measurement light source, and an average value of a vapor pressure distribution between the target surface and the reference surface calculated from intensity information of the light emitted from the non-distance-measurement light source.

2. The measurement apparatus according to claim 1, wherein the wavelength of the non-distance-measurement light source is configured variable according to the optical path length.

3. The measurement apparatus according to claim 1, further comprising a memory configured to store a first relationship among the geometric distance [m], calculation precision $\delta p_w$ [Pa] of vapor pressure, and a product $\sigma_w$ [Pa$^{-1}$m$^{-1}$] between an intensity of an absorption line of water vapor and a peak value of an absorption function, and a second relationship between the product $\sigma_w$ [Pa$^{-1}$m$^{-1}$] and a wavelength of the absorption line of the water vapor [$\lambda$],
   wherein the analyzer obtains, from the first relationship stored in the memory, a value range of the product $\sigma_w$ [Pa$^{-1}$m$^{-1}$] that makes a value of the calculation precision $\delta p_w$ [Pa] corresponding to the optical path length that has been calculated, smaller than predetermined vapor pressure precision $\Delta p_w$,
   wherein the analyzer obtains the wavelength of the absorption line of the water vapor in the value range of the product $\sigma_w$ [Pa$^{-1}$m$^{-1}$] that has been obtained, from the second relationship stored in the memory, and
   wherein the wavelength of the non-distance-measurement light source is set to the wavelength that has been obtained.

4. The measurement apparatus according to claim 1, further comprising a wavelength modulator configured to modulate the wavelength of the non-distance-measurement light source,
   wherein the intensity detector synchronously detects a modulation component of non-distance-measurement light.

5. The measurement apparatus according to claim 1, wherein the non-distance-measurement light source has a single wavelength, and the measurement apparatus further comprises a wavelength modulator configured to modulate the wavelength of the non-distance-measurement light source according to the optical path length.

6. The measurement apparatus according to claim 1, wherein the non-distance-measurement light source includes a plurality of narrow-band light sources having different wavelengths,
   wherein each wavelength of the plurality of narrow-band light sources is set to a wavelength that provides a different peak of the absorption line of the water vapor.

7. The measurement apparatus according to claim 1, wherein the non-distance-measurement light source is a wavelength scanning type light source, and
   wherein the intensity detector obtains transmission spectra of non-distance-measurement light using a plurality of absorption lines of the water vapor.

8. The measurement apparatus according to claim 1, wherein a difference between the wavelength of the non-distance-measurement light source and the wavelength of the distance-measurement light source is 20 nm or smaller.

* * * * *